Patented Feb. 7, 1950

2,496,306

UNITED STATES PATENT OFFICE 2,496,306

ISOLATION OF LOW-METHOXYL PECTINS

Harry S. Owens, Rolland M. McCready, and William D. Maclay, Berkeley, Calif., assignors to the United States of America as represented by the Secretary of Agriculture No Drawing. Application August 9, 1946, Serial No. 689,346

6 Claims. (Cl. 99—132)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the process of isolating low-methoxyl pectins in a dry form without employing the use of organic solvents or vacuum concentration. It has for its object to render the process simpler and cheaper. It can be used to fractionate the pectins, eliminating high-methoxyl pectins which may be undesirable. Low-methoxyl pectins isolated by this technique are readily soluble.

Processes commonly used in the preparation of high-methoxyl pectinic acids, ordinary pectins, include isolation by vacuum concentration of the pectin extraction liquor followed by precipitation with an organic solvent such as ethyl or isopropyl alcohol; or by spray or drum drying; or by precipitating the pectin from the unconcentrated extraction liquor with a soluble aluminum salt at a pH of about 4, followed by removal of the aluminum from the aluminum-pectin complex with acidified aqueous alcohol; or precipitation of the pectin with a metallic ion such as calcium, copper or nickel, followed by removal of the metal by either washing with acidified aqueous alcohol or by means of an ion exchange material.

Each of the above-described methods of isolation embodies the use of either vacuum concentration or large volumes of organic solvents, or both, to yield a water-soluble pectin in a solid state suitable for drying. Vacuum concentration of large volumes of water and precipitation of pectin by means of organic solvents are costly processes. By means of this invention, low-methoxyl pectins can be isolated without resort to either of these two processes.

One aspect of our invention consists in treating solutions or extraction liquors of low-methoxyl pectins, prepared by acidic, alkaline, or enzymic deesterification with sufficient salt, such as sodium chloride, to cause precipitation of the pectin in a physical state suitable for subsequent pressing and drying.

Example I

To 1 liter of 1.0 percent low-methoxyl pectin (deesterified with ammonium hydroxide to a methoxyl content of 3.0 percent) solution of pH 4.0, 50 grams of sodium chloride was added with slow stirring. After allowing 5 minutes for the precipitation to occur, the precipitated pectin was strained from the salt solution, pressed, dried in vacuo at 70° C. for 18 hours, and ground. The yield of dried material was 9.0 grams.

Example II

To 1 liter of 1 percent low-methoxyl pectin (deesterified with ammonium hydroxide to a methoxyl content of 2.2 percent) solution of pH 5 was added 50 grams of sodium chloride with stirring. The precipitation was complete after 5 minutes. The precipitated low-methoxyl pectin was strained from the salt solution, pressed, dried in vacuo for 18 hours at 70° C. and ground to 60 mesh. The yield of dried material was 12.5 grams of 100 percent on the ash-free basis.

Example III

To 3 liters of low-methoxyl pectin (deesterified enzymatically to a methoxyl content of 7.0 percent) solution containing 26 grams of the pectin was added sufficient sodium chloride to make a 5 percent solution. The precipitated pectin was strained, pressed and dried. The dried material contained 5.6 percent methoxyl. The fraction not precipitating, which amounted to 2 grams, was isolated by other means and had a methoxyl content of 9.6 percent.

Example IV

To 26 grams of low-methoxyl pectin (deesterified with pectin esterase to a methoxyl content of 4.5 percent) dissolved in 3 liters of water at pH 4 was added sodium chloride to a concentration of 2 percent. The precipitated pectin was strained, pressed, and dried. It had a methoxyl content of 4.1 percent. The fraction not precipitating amounted to 1.5 grams (6 percent).

A concentration of 1 percent of more of low-methoxyl pectin is preferable.

Alkali metal salts other than sodium chloride can be used as precipitating agents. Sodium sulfate in like percentage concentration is less effective than sodium chloride.

The optimum concentration of sodium chloride used depends upon the concentration of the low-methoxyl pectin solution, its methoxyl content, and the method of deesterification used in the preparation of the low-methoxyl pectin. For example, 1 percent solutions of low-methoxyl pectins, deesterified with ammonia, of 2.2, 3.0, and 3.3 percent methoxyl contents have been precipitated with concentrations of sodium chloride of 2 percent and above, 4 percent and above, and 10 percent and above, respectively. Unfractionated enzymic deesterified pectins of 7 percent methoxyl content in concentrations of 0.82 percent are precipitated in 5 percent sodium chloride solution.

In general, it is preferable to precipitate at pH values of 3 to 5.

Having thus described our invention, we claim:

1. A process for isolating a low-methoxyl pectin from an aqueous solution thereof which comprises dissolving an alkali metal salt in an aqueous solution of a low-methoxyl pectin at a pH from 3 to 5, the concentration of said metal salt being from about 2% to about 10%, and separating the precipitated low-methoxyl pectin from the solution.

2. A process for isolating a low-methoxyl pectin from an aqueous solution thereof which comprises dissolving sodium chloride in an aqueous solution of a low-methoxyl pectinic acid at a pH from 3 to 5, the concentration of said sodium chloride being from about 2% to about 10%, and separating the precipitated low-methoxyl pectin from the solution.

3. A process for separating low- from high-methoxyl pectins which comprises dissolving an alkali metal salt in an aqueous solution of partially de-esterified pectins, the pH of the solution being from 3 to 5 and the concentration of alkali metal salt being from about 2% to about 10%, and separating the precipitated low-methoxyl pectins from the solution containing the high-methoxyl pectins.

4. A process for separating low- from high-methoxyl pectins which comprises dissolving sodium chloride in an aqueous solution of partially de-esterified pectins, the pH of the solution being from 3 to 5, the concentration of said sodium chloride being from about 2% to about 10%, and separating the precipitated low-methoxyl pectins from the solution containing high-methoxyl pectins.

5. A process for separating low- from high-methoxyl pectins which comprises dissolving sodium chloride in an aqueous solution of enzymic partially de-esterified pectins, the pH of the solution being from 3 to 5, the concentration of said sodium chloride being from about 2% to about 10%, and separating the precipitated low-methoxyl pectins from the solution containing high-methoxyl pectins.

6. A process for separating low- from high-methoxyl pectins which comprises dissolving sodium chloride in an aqueous solution containing both low- and high-methoxyl pectins produced by the action of pectinesterase on pectin, the pH of the solution being from 3 to 5, the concentration of said sodium chloride being about 2 to about 10%, and separating the precipitated low-methoxyl pectins from the solution containing the high-methoxyl pectins.

HARRY S. OWENS.
ROLLAND M. McCREADY.
WILLIAM D. MACLAY.

REFERENCES CITED

The following references are of record in the file of this patent:

UNITED STATES PATENTS

| Number | Name | Date |
|---|---|---|
| 1,497,884 | Jameson et al. | June 17, 1924 |
| 1,513,615 | Leo | Oct. 28, 1924 |
| 1,634,879 | Nanji | July 5, 1927 |
| 1,991,242 | Cole et al. | Feb. 12, 1935 |
| 2,008,999 | Wallerstein | July 23, 1935 |
| 2,132,065 | Wilson | Oct. 4, 1938 |
| 2,132,577 | Olsen et al. | Oct. 11, 1938 |
| 2,358,430 | Willaman | Sept. 19, 1944 |
| 2,380,739 | Evans et al. | July 31, 1945 |
| 2,386,323 | Lineweaver et al. | Oct. 9, 1945 |
| 2,392,854 | Leo et al. | Jan. 15, 1946 |
| 2,406,840 | Leo et al. | Sept. 3, 1946 |

OTHER REFERENCES

Jour. Phys. Chem. v. 33 (1929) page 2017 by Spencer.